(12) United States Patent
Ikushima et al.

(10) Patent No.: US 9,288,418 B2
(45) Date of Patent: Mar. 15, 2016

(54) VIDEO SIGNAL TRANSMITTER APPARATUS AND RECEIVER APPARATUS USING UNCOMPRESSED TRANSMISSION SYSTEM OF VIDEO SIGNAL

(71) Applicant: Panasonic Corporation, Osaka (JP)

(72) Inventors: Tsuyoshi Ikushima, Nara (JP); Osamu Shibata, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 14/493,656

(22) Filed: Sep. 23, 2014

(65) Prior Publication Data

US 2015/0009408 A1 Jan. 8, 2015

Related U.S. Application Data

(63) Continuation of application No. PCT/JP2013/000492, filed on Jan. 30, 2013.

(30) Foreign Application Priority Data

Apr. 3, 2012 (JP) ................. 2012-084788

(51) Int. Cl.
*H04N 5/38* (2006.01)
*H04N 7/08* (2006.01)
(Continued)

(52) U.S. Cl.
CPC .. *H04N 5/38* (2013.01); *G09G 5/00* (2013.01); *H04N 5/44* (2013.01); *H04N 7/0102* (2013.01); *H04N 7/08* (2013.01); *H04N 21/43635* (2013.01)

(58) Field of Classification Search
CPC ..... H04N 5/38; H04N 5/4401; H04N 5/0675; H04N 5/46
USPC ................. 348/723, 554, 555, 556
See application file for complete search history.

(56) References Cited

U.S. PATENT DOCUMENTS 5,576,771 A * 11/1996 Van Tol ................ H04N 7/0122
348/445
6,107,984 A 8/2000 Naka et al.
(Continued)

FOREIGN PATENT DOCUMENTS

JP 08-182020 7/1996
JP 09-244611 9/1997
(Continued)

OTHER PUBLICATIONS

International Preliminary Report on Patentability and Written Opinion of the International Searching Authority issued Oct. 16, 2014 in International (PCT) Application No. PCT/JP2013/000492.
(Continued)

*Primary Examiner* — Michael Lee
(74) *Attorney, Agent, or Firm* — Wenderoth, Lind & Ponack, L.L.P.

(57) ABSTRACT

In a video signal transmitter apparatus that removes a part of a blanking interval of a video signal, generates a converted video signal, based on the video signal including an active interval including video data and the blanking interval excluding the video data, a frequency divider divides a frequency of a pixel clock in synchronization with the video signal by a ratio of transmission frequency division, generate and output a frequency-divided clock as a converted pixel clock. A controller controls a first storage unit to write the video signal for the active interval of the video signal, and read the video signal for the active interval of the converted video signal and output a read video signal as the converted video signal, and to remove a part of a signal included in a horizontal blanking interval existing periodically every horizontal line for the blanking interval of the video signal.

10 Claims, 13 Drawing Sheets

(51) Int. Cl.
   *H04N 5/44* (2011.01)
   *G09G 5/00* (2006.01)
   *H04N 7/01* (2006.01)
   *H04N 21/4363* (2011.01)

(56) References Cited

U.S. PATENT DOCUMENTS

| | | |
|---|---|---|
| 6,515,708 B1 | 2/2003 | Kato |
| 7,567,588 B2 | 7/2009 | Satoh et al. |
| 2005/0047447 A1 | 3/2005 | Satoh et al. |
| 2008/0043148 A1* | 2/2008 | Lai .................... G09G 5/008 348/581 |
| 2011/0175866 A1* | 7/2011 | Uehara .................... H03L 7/18 345/204 |

FOREIGN PATENT DOCUMENTS

| | | |
|---|---|---|
| JP | 2000-152121 | 5/2000 |
| JP | 2005-102161 | 4/2005 |

OTHER PUBLICATIONS

International Search Report issued May 7, 2013 in International (PCT) Application No. PCT/JP2013/000492 with English translation.

* cited by examiner

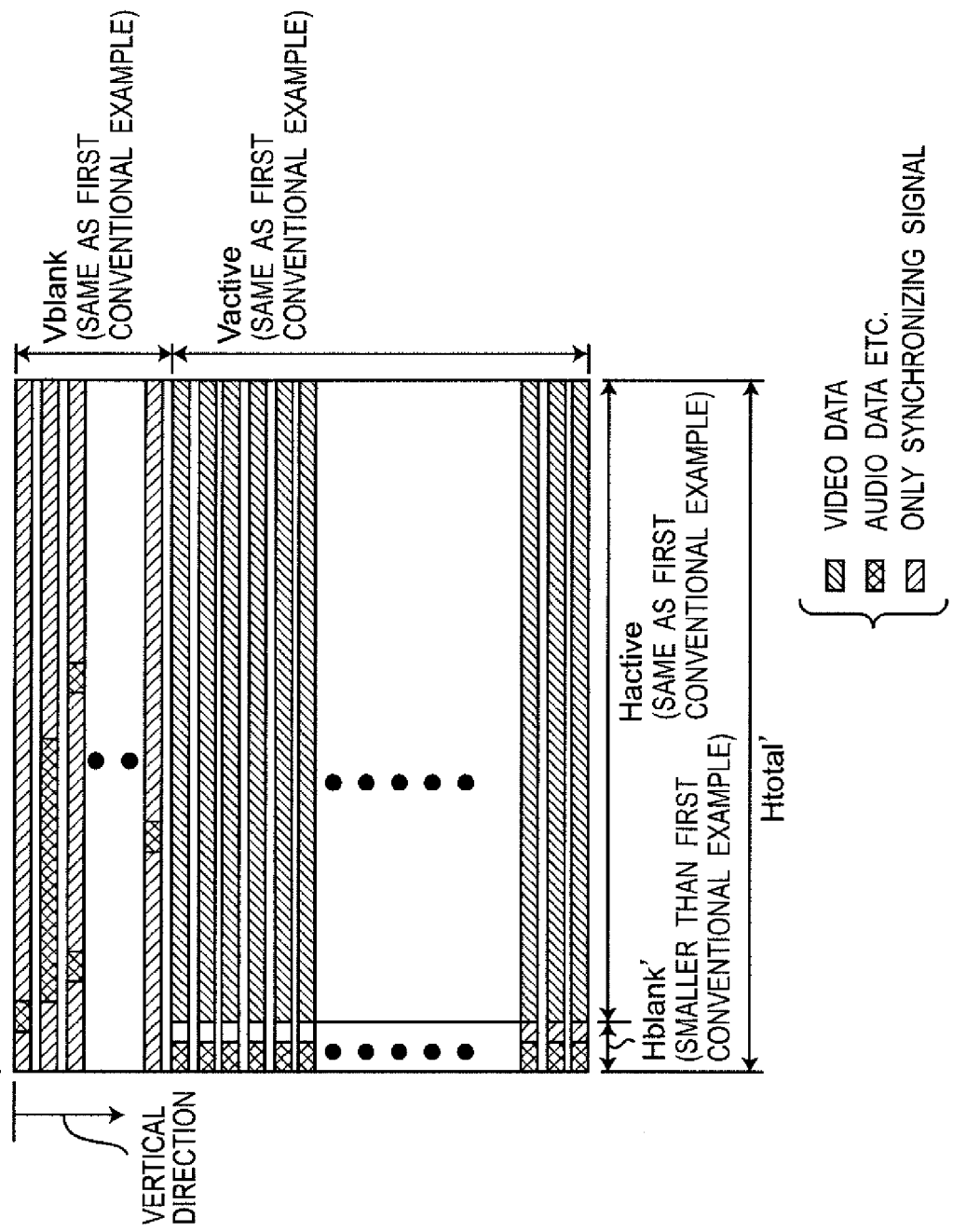

Fig.2B

| FORMAT OF VIDEO SIGNAL | RATIO OF FREQUENCY DIVISION FOR TRANSMISSION | NUMBER OF HORIZONTAL PIXCELS | | | | | TRANSMISSION RATE | |
|---|---|---|---|---|---|---|---|---|
| | | ACTIVE INTERVAL | BLANKING INTERVAL | | TOTAL | | | |
| | | | BEFORE REMOVE | AFTER REMOVE | BEFORE REMOVE | AFTER REMOVE | BEFORE REMOVE | AFTER REMOVE |
| | | pixel | pixel | pixel | pixel | pixel | Gbps | Gbps |
| 4K2K | 20/22 | 3840 | 560 | 160 | 4400 | 4000 | 5.94 | 5.40 |

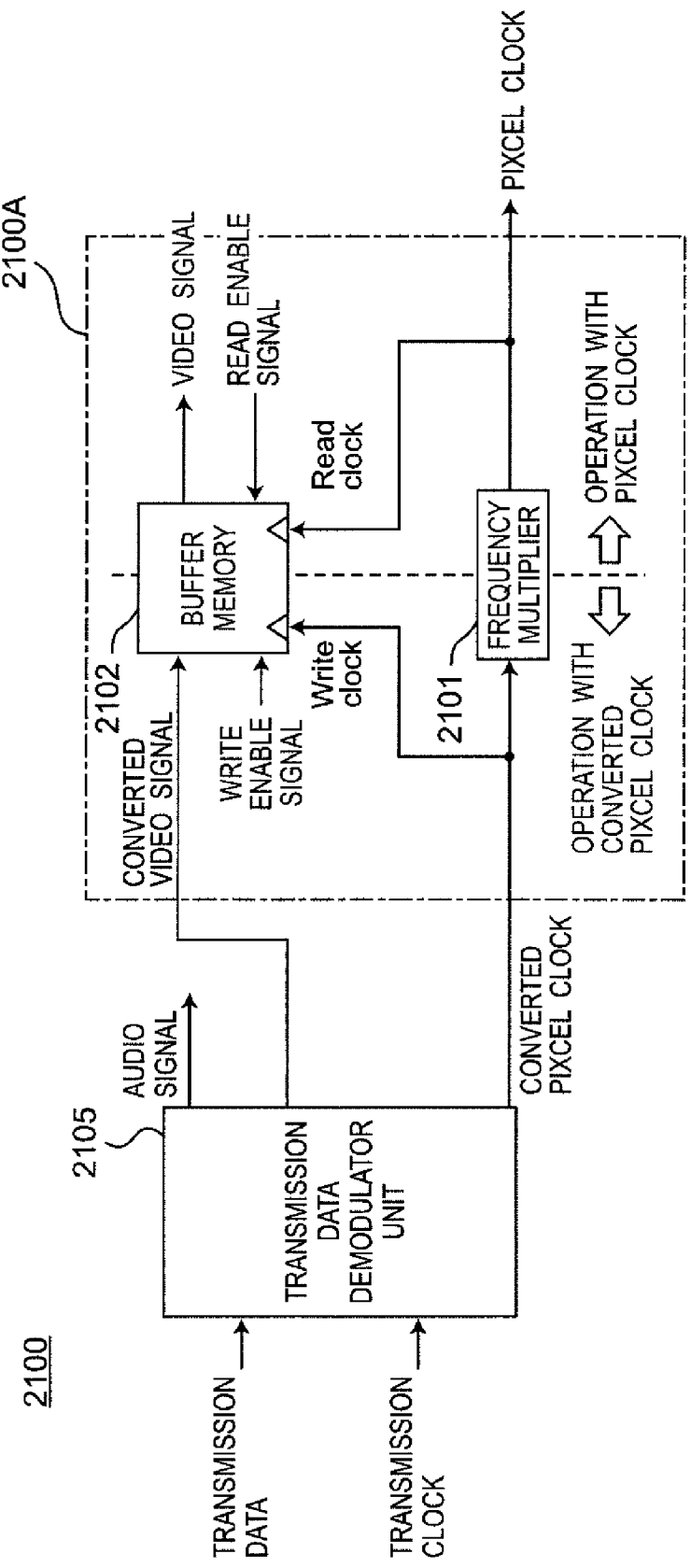

| FORMAT OF VIDEO SIGNAL | RATIO OF FREQUENCY DIVISION FOR TRANSMISSION | NUMBER OF HORIZONTAL PIXELS | | | | | | TRANSMISSION RATE | |
|---|---|---|---|---|---|---|---|---|---|
| | | ACTIVE INTERVAL | BLANKING INTERVAL | | TOTAL | | | BEFORE REMOVE | AFTER REMOVE |
| | | | BEFORE REMOVE | AFTER REMOVE | BEFORE REMOVE | AFTER REMOVE | | | |
| | | pixel | pixel | pixel | pixel | pixel | | Gbps | Gbps |
| 720p | 22/25 | 1280 | 370 | 172 | 1650 | 1452 | | 0.74 | 0.65 |
| 1080p | 22/25 | 1920 | 280 | 16 | 2200 | 1936 | | 1.49 | 1.31 |
| 4K2K | 22/25 | 3840 | 560 | 32 | 4400 | 3872 | | 5.94 | 5.23 |

COMMON DIVISOR
2,5,10,11,22,25
50,55,110,275,550

VIDEO SIGNAL TRANSMITTER APPARATUS AND RECEIVER APPARATUS USING UNCOMPRESSED TRANSMISSION SYSTEM OF VIDEO SIGNAL

CROSS-REFERENCE TO RELATED APPLICATIONS

This is a continuation application of International Application No. PCT/JP2013/000492, with an international filing date of Jan. 30, 2013, which claims priority of Japanese Patent Application No. JP2012-084788 filed on Apr. 3, 2012, the content of which is incorporated herein by reference.

BACKGROUND OF THE INVENTION

1. Field of the Invention

The technical field relates to a video signal transmitter apparatus, a video signal transmitting method, a video signal receiver apparatus, and a video signal receiving method, each using uncompressed transmission system for video signals, such as HDMI (High-Definition Multimedia Interface).

2. Description of the Related Art

Conventionally, as an uncompressed transmission system for a video signal, HDMI has been widely used. The video signal transmitter apparatus of HDMI converts video signals of three channels (RGB signals or a luminance signal and color difference signals) among from input signals, into signals of eight bit width, according to need. At that time, the transmission rate of the pixel clock is also converted in accordance with that of the video signal. Thereafter, transmission data is generated based on the video signal, a horizontal synchronizing signal, a vertical synchronizing signal, an audio signal. In this case, encryption is performed as necessary. Thereafter, encoding and parallel to serial conversion are performed on the transmission data, and then, a transmission signal is transmitted. In the video signal receiver apparatus, serial to parallel conversion and decoding are performed on the received signal to restore the video signal and the audio signal. In addition, the number of bits of the video signal is converted so as to be the original value according to need.

A related patent document is Japanese patent laid-open publication No. JP 2005-102161A.

Recently, a scheme for reducing the transmission rate by removing a blanking interval has been examined (for example, See JP 2005-102161A). However, in order to remove the blanking interval in the vertical direction, it is necessary to hold the video data using a buffer memory, at a maximum, for an interval corresponding to the blanking interval. Due to this, there is such a problem that a large buffer memory is needed, and this leads to increase in the circuit scale.

SUMMARY OF THE INVENTION

One non-limiting and exemplary embodiment provides a video signal transmitter apparatus, a video signal transmitting method, a video signal receiver apparatus, and a video signal receiving method, each capable of lowering the transmission rate by removing the blanking interval without large increase in the circuit scale.

According to a first aspect of the present disclosure, there is provided a video signal transmitter apparatus that removes a part of a blanking interval of a video signal, generates and outputs a converted video signal, based on the video signal including an active interval including video data and the blanking interval excluding the video data. The video signal transmitter apparatus includes a frequency divider, a first storage unit, and a first controller. The frequency divider divides a frequency of a pixel clock in synchronization with the video signal by a predetermined ratio of transmission frequency division, generates and outputs a frequency-divided clock as a converted pixel clock. The first storage unit stores the video signal. The first controller controls the first storage unit to write the video signal for the active interval of the video signal, and read the video signal for the active interval of the converted video signal and output a read video signal as the converted video signal, and controls the first storage unit to remove a part of a signal included in a horizontal blanking interval existing periodically every horizontal line for the blanking interval of the video signal. The ratio of transmission frequency division is equal to a ratio of a number of horizontal pixels of the converted video signal to a number of horizontal pixels of the video signal.

According to a second aspect of the present disclosure, there is provided a video signal receiver apparatus that receives a converted video signal from the video signal transmitter apparatus and restores and outputs the video signal. The video signal receiver apparatus includes a frequency multiplier, a second storage unit, and a second controller. The frequency multiplier multiplies a frequency of the converted pixel clock by a predetermined ratio of receiving frequency multiplication, and output a frequency-multiplied converted pixel clock as a pixel clock. The second storage unit stores the converted video signal. The second controller controls the second storage unit to write the converted video signal in the second storage unit for the active interval of the converted video signal, and to read the converted video signal from the second storage unit for the active interval of the video signal and output a read converted video signal as the video signal. The ratio of receiving frequency multiplication is a ratio of the number of horizontal pixels of the video signal to the number of horizontal pixels of the converted video signal.

These general and particular aspects may be realized by a system, a method, a computer program, and any combination of the system, the method and the computer program.

Therefore, according to the video signal transmitter apparatus of the present disclosure, it is possible to greatly reduce the storage capacity required for a buffer memory by removing only the horizontal blanking interval without removing the vertical blanking interval. Further, sharing of the video signal transmitter apparatus with the case without removing the blanking interval is also easy. Therefore, it is possible to reduce the transmission rate by removing the blanking interval with minimizing the increase in circuit scale. In addition, according to the video signal receiver apparatus of the present disclosure, it is possible to receive a signal with a removed blanking interval, and to restore the received signal to a video signal having the same signal format for transmission data as that of the prior art and output the same signal.

Additional benefits and advantageous of the disclosed embodiment will be apparent from the specification and Figures. The benefits and/or advantages may be individually provided by various embodiments and features of the specification and drawings disclosure, and need not all be provided in order to obtain one or more of the same.

BRIEF DESCRIPTION OF THE DRAWINGS

These and other objects and features of the present invention will become clear from the following description taken in conjunction with the embodiments thereof with reference to the accompanying drawings throughout which like parts are designated by like reference numerals, and in which:

FIG. 2A is a diagram showing a format of a converted video signal used in the video signal transmitter apparatus 1100 of FIG. 2A.

FIG. 2B is a table showing a method of setting a ratio of transmission frequency division of each signal format for transmission data according to the first embodiment.

FIG. 3 is a block diagram showing a configuration of a video signal receiver apparatus 2100 according to the first embodiment of the present disclosure.

DETAILED DESCRIPTION OF THE EMBODIMENTS

Figure 1:
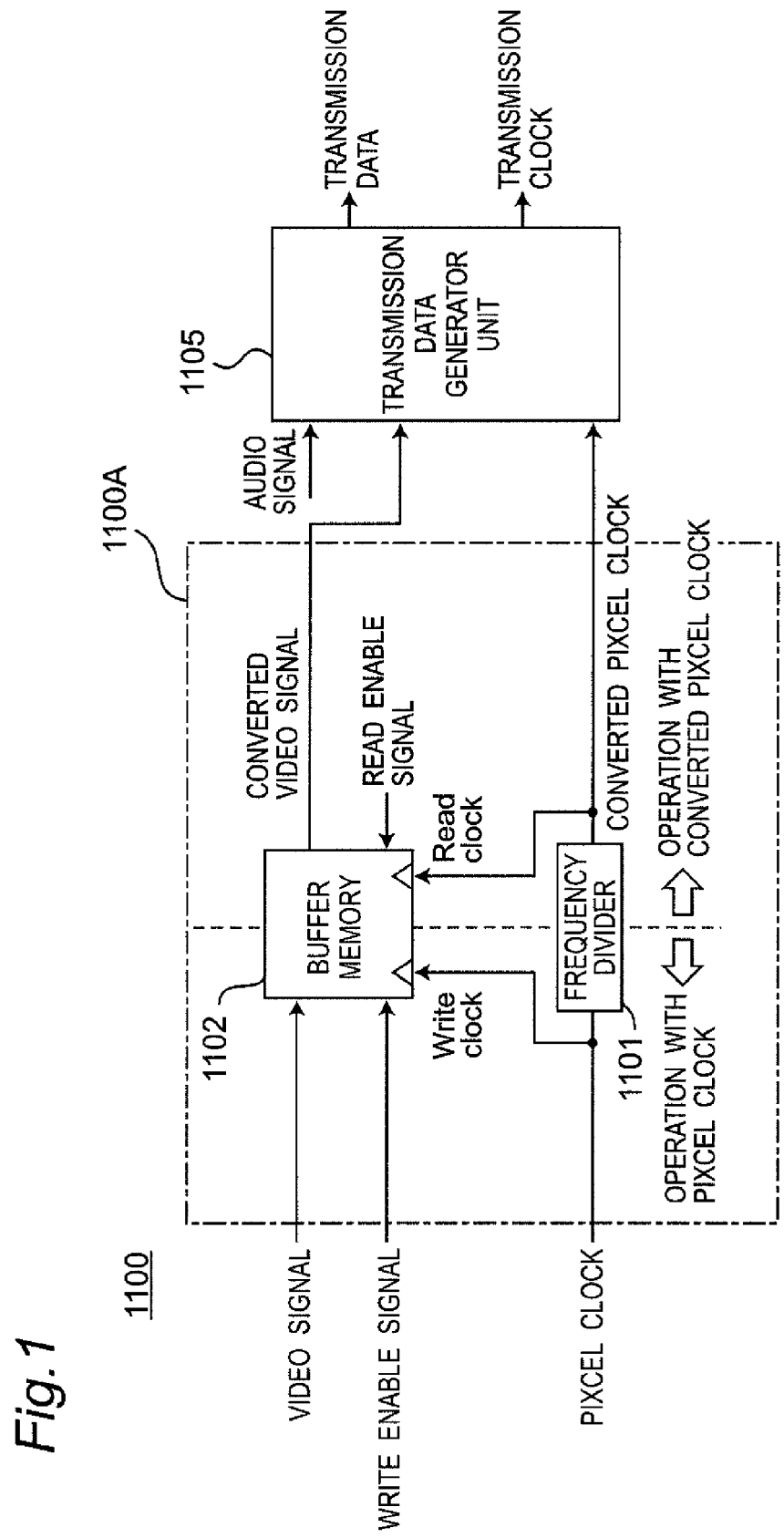
FIG. 1 is a block diagram showing a configuration of a video signal transmitter apparatus 1100 according to a first embodiment of the present disclosure.

Embodiments will be described below with reference to the drawings. Note that in the following embodiments like components are denoted by the same reference characters.

1. Summary

Figure 9:
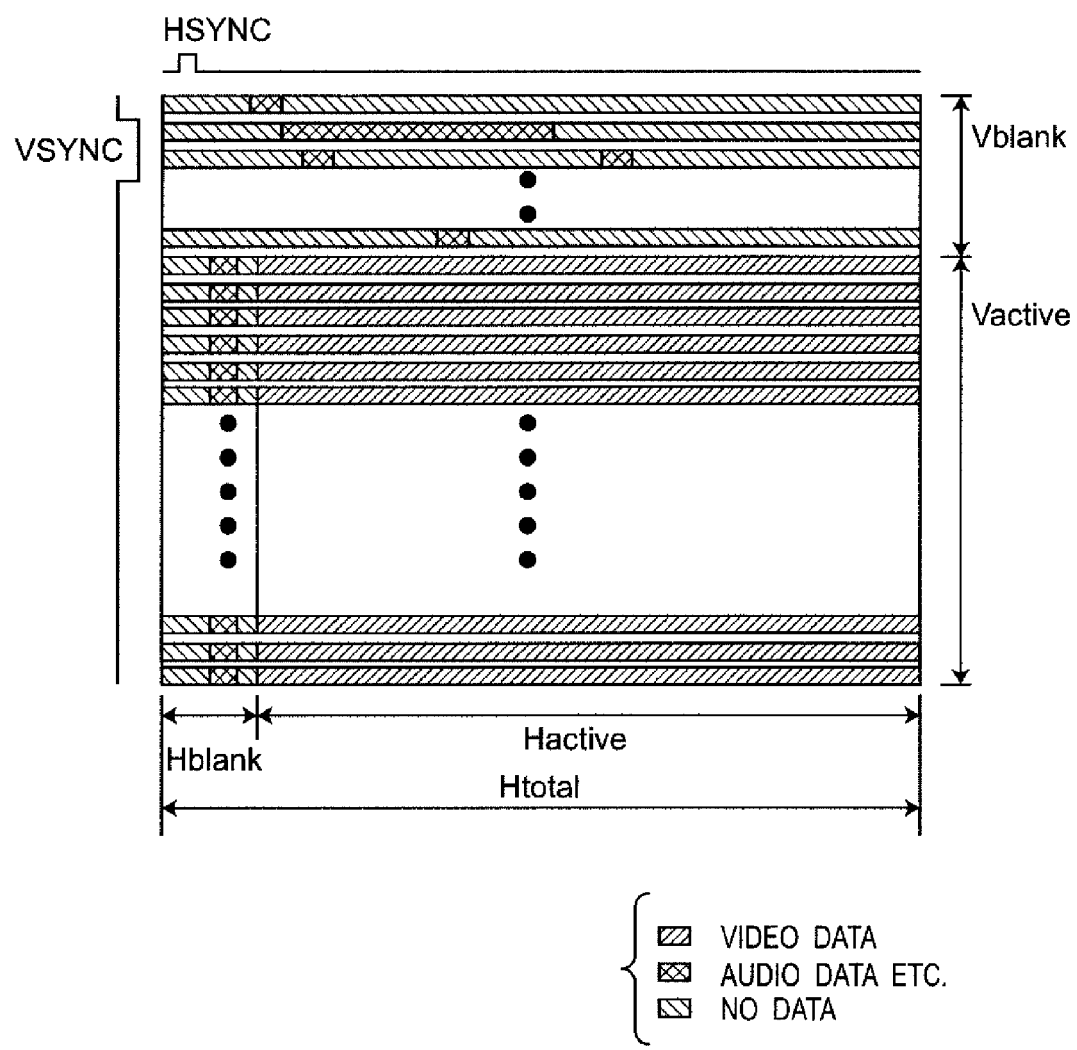
FIG. 9 is a diagram showing a signal format of general data transmission.

FIG. 9 is a diagram showing a signal format of general transmitted data. Referring to FIG. 9, the transmission data is transmitted line by line in the vertical direction from the top to the bottom of the screen, in synchronization with the video signal. In this case, Hactive denotes an active interval of the horizontal blanking interval in the horizontal direction, Hblank denotes a blanking interval in the horizontal direction, Vactive denotes an active interval in the vertical direction, and Vblank denotes a blanking interval in the vertical direction. The overall interval of respective one line in the range of Vblank is configured by one blanking interval. On the other hand, the line for an interval Vactive includes both of pixels included in the active interval and pixels included in the blanking interval in the horizontal direction. For the active interval, the video data is transmitted. On the other hand, by using a part of the blanking interval of the video signal, audio data etc. is transmitted. The remainder of the blanking interval does not contribute to the data transmission. It is noted that, correctly speaking, only the value of the synchronizing signal is transmitted, however, this interval is not required for data transmission since the synchronization signal may be transmitted simultaneously with the audio data.

By the way, the ratio of the blanking interval to the video signal reaches 20% or less in the case of full high-definition (1080p), 10% or less remains even when the ratio of the interval required for the audio signal transmission is subtracted from the same blanking interval. Therefore, the transmission rate increases with high definition of the video data, and this leads to the amount of signal for the blanking interval, which does not contribute to the data transmission, also increases. Therefore, the system for decreasing the transmission rate by removing the blanking interval has been investigated.

Figure 10:
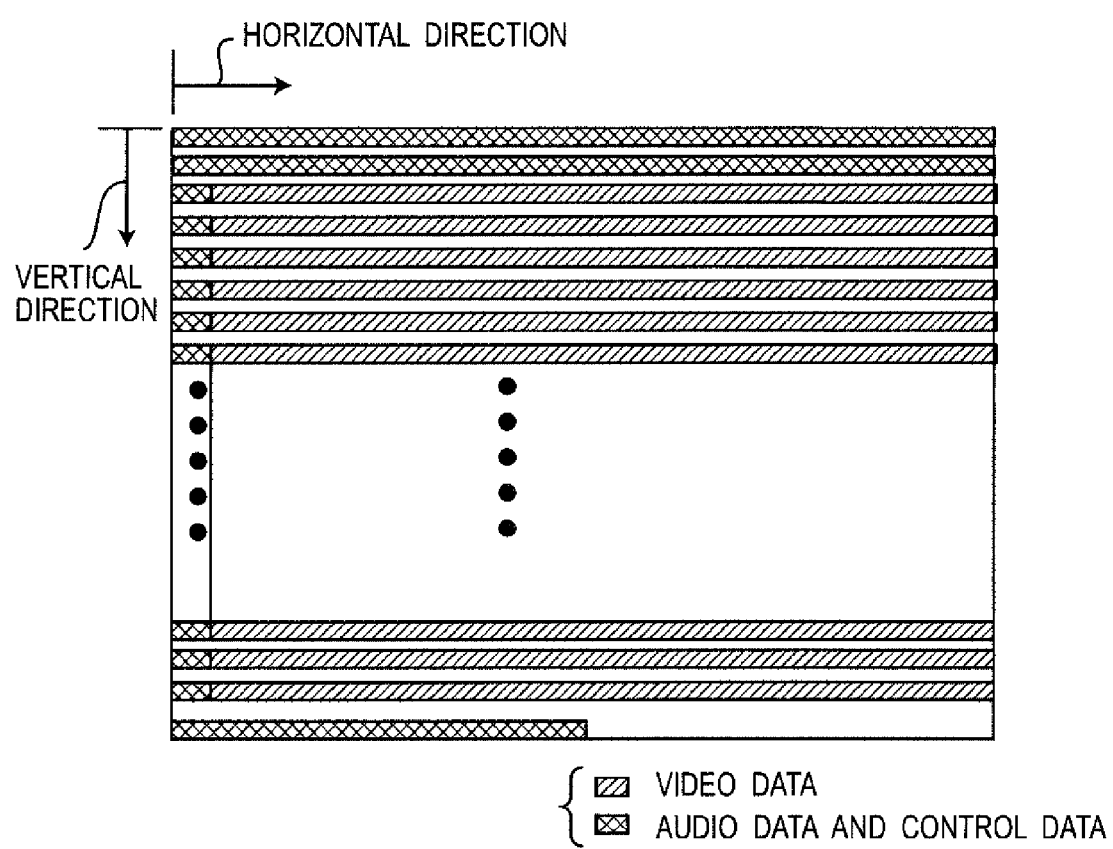
FIG. 10 is a diagram showing a signal format of general further transmission data.

FIG. 10 is a diagram showing a signal format of a further transmission data. In the example of FIG. 10, the transmission frame is composed only of video data, audio data, and the control data, and all intervals with no data transmission are removed among from the blanking interval. Thus, the amount of data required for data transmission is reduced as compared with the amount of data of the original video data, and this leads to reduction in the transmission rate.

When transmitting a video signal with converting a video signal having a signal format shown in FIG. 9 into a video signal having a signal format shown in FIG. 10, there are the following problems.

(1) In order to remove the blanking interval in the vertical direction, it is necessary to hold the video data by using a buffer memory for a time interval corresponding to the removed blanking interval at a maximum. Due to this, the buffer memory having a larger storage capacity is needed, and the circuit scale increases. Moreover, this problem becomes more pronounced according to the high definition of the image.

(2) Because of a large difference in signal format between the HDMI and the video signal having the signal format shown in FIG. 10, it is necessary to provide a transmitter circuit and a receiver circuit, separately, in the case of using both of the signal format of the HDMI and the signal format shown in FIG. 10 (for example, to selectively use one of them depending on the resolution), and this leads to increase in the circuit scale.

(3) Since the ratio of the transmission rate of the original video signal to the overall transmission rate cannot be expressed by a ratio of a small natural number, the configurations of the frequency multiplier for the clock in the video signal transmitter apparatus and the frequency divider for the clock in the video signal receiver apparatus become complicated, and implementation thereof is difficult in some cases.

In order to solve the above problems, in the video signal transmitter apparatus according to embodiments of the present disclosure, the video signal including the blanking interval is inputted. The blanking interval includes a blanking interval in the vertical direction (referred to as a vertical blanking interval hereinafter) Vblank, and a blanking interval in the horizontal direction (referred to as a horizontal blanking interval hereinafter) Hblank. However, in the present embodiment, only the horizontal blanking interval Hblank is removed. In this case, only for a time interval corresponding to the horizontal blanking interval Hblank at a maximum, the video data should be held by using the buffer memory, and therefore, this leads to decrease in the storage capacity of the buffer memory as compared with that of the prior art. In addition, all the blanking intervals in the horizontal direction are not removed such that a part of the blanking interval in the horizontal direction remains. As a result, the data length in the horizontal direction after removing the blanking interval can be flexibly set. Specific methods of removing the blanking interval will be described in the following embodiments.

2. First Embodiment 2-1. Video Signal Transmitter Apparatus 1100

FIG. 1 is a block diagram showing a configuration of a video signal transmitter apparatus 1100 according to a first embodiment of the present disclosure. Referring to FIG. 1, the video signal transmitter apparatus 1100 is configured to include a video signal transmitter unit 1100A, and a transmission data generator unit 1105, where the video signal transmitter unit 1100A is configured to include a frequency divider 1101, and a buffer memory 1102.

Referring to FIG. 1, a pixel clock having the same transmission rate as that of the video signal is inputted to the frequency divider 1101, the frequency divider 1101 performs frequency division on the input pixel clock with a predetermined ratio of transmission frequency division which will be described in detail later, and outputs the pixel clock after the frequency division as a converted pixel clock to the buffer memory 1102 and the transmission data generator unit 1105. The video signal, a write enable signal, a read enable signal, the pixel clock, and the converted pixel clock are inputted to the buffer memory 1102. Then, when the write enable signal is "1", the buffer memory 1102 performs write-in of the video signal in synchronization of the pixel clock (Write clock). When the read enable signal is "1", the buffer memory 1102 performs read-out of written data in synchronization of the converted pixel clock (Read clock), and outputs read data signal as a converted video signal to the transmission data generator unit 1105.

Then, in a manner similar to that of the prior art, the transmission data generator unit 1105 combines the input converted video signal and audio signal with the converted pixel clock, encodes a combined signal, and parallel-to-serial-converts an encoded signal to generate and output a predetermined transmission data and a transmission clock to a predetermined transmission line. That is, the transmission data generator unit 1105 performs, for example, conversion into a converted video signal of 8-bit width and conversion of transmission rate of the converted pixel clock, if necessary, and then, performs processes of generation of transmission data, encoding and parallel-to-serial-conversion. In the case of the video signal of 8-bit width and the converted video signal of 8-bit width, the numbers of the video signal and the converted video signal coincide with the numbers of bits in temporal direction, respectively. It is noted that FIG. 1A shows that the transmission data generator unit 1105 outputs the transmission clock, however, the transmission data generator unit 1105 may perform encoding suitable for clock regeneration such as 8B10B with a configuration of no clock transmission.

FIG. 1 shows one line system of each of the video signal and converted video signal, however, there are actually respective video signals of three channels in a manner similar to that of the configuration of FIG. 9. Thus, the buffer memory 1102 is also provided for each of the video signals of three channels. This also applies to the following embodiments. It is noted that the number of video signals may be reduced to one or two, or may be increased to four or more.

FIG. 2A is a diagram showing a format of the converted video signal used in the video signal transmitter apparatus 1100 of FIG. 1. The input video signal includes the horizontal blanking interval Hblank and the vertical blanking interval Vblank which are shown in FIG. 9. In contrast, as shown in FIG. 2A, a number of horizontal pixels of an active interval in the horizontal direction (referred to as a horizontal active interval hereinafter) Hactive and a number of vertical lines of an active interval in the vertical direction (referred to as a vertical active interval hereinafter) Vactive are the same as those of the input video signal, respectively. In addition, a number of lines of the vertical blanking interval Vblank is the same as that of the input video signal. Thus, the number of vertical lines, which is the sum of the vertical blanking interval and vertical Vblank active interval Vactive, is the same as that of the input video signal. Meanwhile, the number of pixels in the horizontal blanking interval Hblank' is set to be smaller than that of the input video signal. Thus, the number of horizontal pixels, which is the sum of the number of pixels in the horizontal active interval Hactive and the number of pixels in the horizontal blanking interval Hblank', becomes smaller than that of the input video signal.

As described above, if the times required to transmit the image of one frame are the same as each other between the input video signals and the converted output video signal, the times required to transmit data of one line become the same as each other therebetween. Therefore, the ratio of the transmission rate f of the video signal to the transmission rate f' of the converted video signal is equal to the ratio of the number Nt of horizontal pixels of the video signal to the number Nt' of horizontal pixels of the converted video signal. That is, it is set to satisfy the following relationship:

$$Nt/Nt'=f/f' \qquad (1).$$

Thus, the ratio of transmission frequency division of the frequency divider 1101 and the number of horizontal pixels of the converted video signal are set to satisfy the following conditions:

(1) The ratio of transmission frequency division is equal to the ratio of the number of horizontal pixel of the video signal to the number of horizontal pixel of the converted video signal.

(2) The ratio of transmission frequency division is expressed by a fraction having a denominator of a divisor of the number of horizontal pixels other than one and the number of horizontal pixels of the video signal, and having a numerator of a natural number.

(3) The number of horizontal pixels of the converted video signal is larger than the number of pixels of horizontal active interval Hactive.

Using the divisor of the number of horizontal pixels other than one and the number of horizontal pixels of the video signal as the denominator of the fraction allows the number of horizontal pixels of the converted video signal to be a natural number. In addition, by using even numbers as both the denominator and the numerator, respectively, it is easy to configure the frequency divider 1101. Further, by setting a small value to the denominator as small as possible in the range of satisfying the above-mentioned conditions, it is possible to further simplify the structure of the frequency divider 1101. On the other hand, by setting a small value to the devisor as small as possible, the ratio of removal of the blanking interval can be heightened. Further, when transmitting the audio signal, the audio signal is transmitted by packetizing the same audio signal with the blanking interval shown in FIG. 2A. In this case, it is noted that the length of the horizontal blanking interval Hblank' of FIG. 2A is set to be able to secure the number of bits required for transmission of the audio signal.

FIG. 2B is a table showing a method of setting a ratio of transmission frequency division of each signal format for transmission data according to the first embodiment. FIG. 2B shows a setting example of the ratio of transmission frequency division in the case of 4K2K format which satisfies the above-mentioned conditions, where the ratio of frequency division is 20/22, and the transmission rate is reduced by about 9%.

In addition, the write enable signal is set to "1" for the horizontal active interval Hactive of FIG. 9, and is set to "0" for the horizontal blanking interval Hblank of FIG. 9. On the other hand, the read enable signal is set to "1" for the horizontal active interval Hactive of FIG. 2A, and is set to "0" for the horizontal blanking interval Hblank'.

According to the video signal transmitter apparatus 1100 according to the first embodiment which is configured as described above, unlike the prior art, only the horizontal blanking interval Hblank is removed without removal of the vertical blanking interval Vblank. Therefore, the storage capacity corresponding to the horizontal blanking interval Hblank should be reserved for the storage capacity of the buffer memory 1102, and can be greatly removed as compared with that of the prior art. In addition, the circuits in the subsequent stage of the blanking interval removal process can be utilized since the configuration of the video signal transmitter apparatus can be used as it is, and therefore, it is easy to configure a common circuit between these circuits and a video signal transmitter circuit for HDMI. Accordingly, it is possible to suppress the increase in the circuit scale, and to realize removal of the blanking interval.

2-2. Video Signal Receiver Apparatus 2100

FIG. 3 is a block diagram showing a configuration of a video signal receiver apparatus 2100 according to the first embodiment of the present disclosure. The video signal receiver 2100 according to the first embodiment performs a reverse process of the video signal transmitter apparatus 1100 to restore the original video signal. Referring to FIG. 3, the video signal receiver apparatus 2100 is configured to include a transmission data demodulator unit 2105, and a video signal receiver unit 2100A. In this case, the video signal receiver unit 2100A is configured to include a frequency multiplier 2101, and a buffer memory 2102.

Referring to FIG. 3, the transmission data and transmission clock, which are transmitted through a predetermined transmission path from the video signal transmitter apparatus 1100 of FIG. 1, is inputted to the transmission data demodulator unit 2105, and the transmission data demodulator 2105 performs a reverse process of that of the transmission data generator unit 1105 of FIG. 1 on the input transmission data and the input transmission clock. That is, the transmission data demodulator unit 2105 separates an audio signal from the input transmission data with the transmission clock, and performs decoding and serial-to-parallel conversion to generate and output a converted video signal and an audio signal. It is noted that the transmission clock can be obtained by clock regeneration without receiving the transmission clock separately from the transmission data.

A converted pixel clock having the same transmission rate as that of the converted video signal is inputted to the frequency multiplier 2101. Then, the frequency multiplier 2101 performs frequency multiplication on the input converted pixel clock with a ratio of receiving frequency multiplication equal to the ratio of the number of horizontal pixels of the converted video signal to the number of horizontal pixels of the video signal (namely, it is equal to a reciprocal number of the ratio of transmission frequency division in the frequency divider 1101 of FIG. 1), and outputs a clock after the frequency multiplication as a pixel clock. It is noted that when the denominator and the numerator are set to even numbers, respectively, it is easy to configure the frequency multiplier 2101. The converted video signal, a write enable signal, a read enable signal, the converted pixel clock and the pixel clock are inputted to the buffer memory 2102. Then the buffer memory 2102 performs write-in of the converted video signal in synchronization of the converted pixel clock when the write enable signal is "1", and performs read-out of the written data in synchronization of the pixel clock when the read enable clock is "1" and outputs the read data as the video signal. In this case, the write enable signal is generated to be "1" for the horizontal active interval Hactive of FIG. 9, and is generated to be "0" for the horizontal blanking interval Hblank of FIG. 9. On the other hand, the read enable signal is generated to be "1" for the horizontal active interval Hactive of FIG. 2A, and is generated to be "0" for the horizontal blanking interval Hblank.

FIG. 3 shows the configuration for only the video signal and the converted video signal each of one channel for simple illustration, however, there are actually the video signals and the converted video signals each of three channels in a manner similar to that of the configuration of FIG. 10. Therefore, the buffer memory 2102 is provided for the video signals of three channels. This is applied to the following embodiments. It is noted that the number of channels of the video signals can be reduced to one or two, or can be increased to four or more.

According to the video signal receiver apparatus 2100 according to the first embodiment which is configured as described above, the video signal receiver apparatus 2100 can receive the transmission data generated by the video signal transmitter 1100, and restores the received transmission data into the video signal having the same signal format as that of the prior art.

3. Second Embodiment 3-1. Video Signal Transmitter Apparatus 1200

Figure 4A:
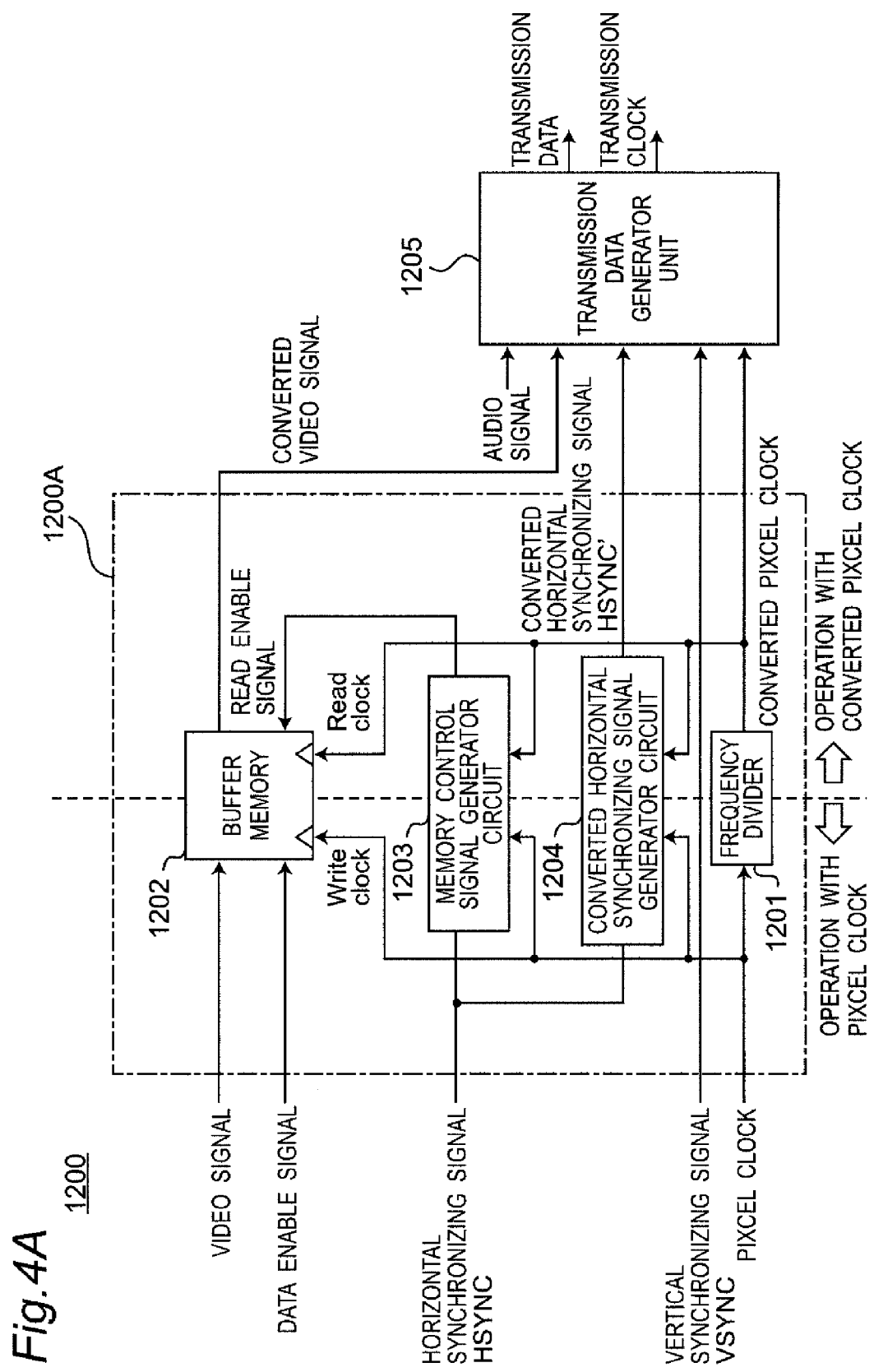
FIG. 4A is a block diagram showing a configuration of a video signal transmitter apparatus 1200 according to a second embodiment of the present disclosure.

FIG. 4A is a block diagram showing a configuration of a video signal transmitter apparatus 1200 according to a second embodiment of the present disclosure. Referring to FIG. 4A, the video signal transmitter apparatus 1200 is configured to include a video signal transmitter unit 1200A, and a transmission data generator unit 1205. In this case, the video signal transmitter unit 1200A is configured to include a frequency divider 1201, a buffer memory 1202, a memory control signal generator circuit 1203, and a converted horizontal synchronizing signal generator circuit 1204. The frequency divider 1201 and the buffer memory 1202 operate fundamentally in manners similar to those of the frequency divider 1101 and the buffer memory 1102 of the first embodiment, respectively. It is noted that FIG. 4A shows the transmission data generator unit 1205 outputs a transmission clock, however, encoding suitable for clock regeneration such as 8B10B may be performed on the transmission data with no clock transmission. The configuration of the video signal transmitter apparatus 1200 will be described by differences from the video signal transmitter apparatus 1100 of FIG. 1A.

Referring to FIG. 4, a horizontal synchronization signal HSYNC, a pixel clock and a converted pixel clock are inputted to the memory control signal generator circuit 1203, and the memory control signal generator circuit 1203 generates such a read enable signal that is set to "1" for the horizontal active interval Hactive' of the converted video signal and is set to "0" for the horizontal blanking interval Hblank' thereof, and outputs the same read enable signal to the buffer memory 1202. In this case, a data enable signal may be inputted instead of the horizontal synchronizing signal HSYNC. A method of generating a read enable signal will be described in detail.

Figure 4B:
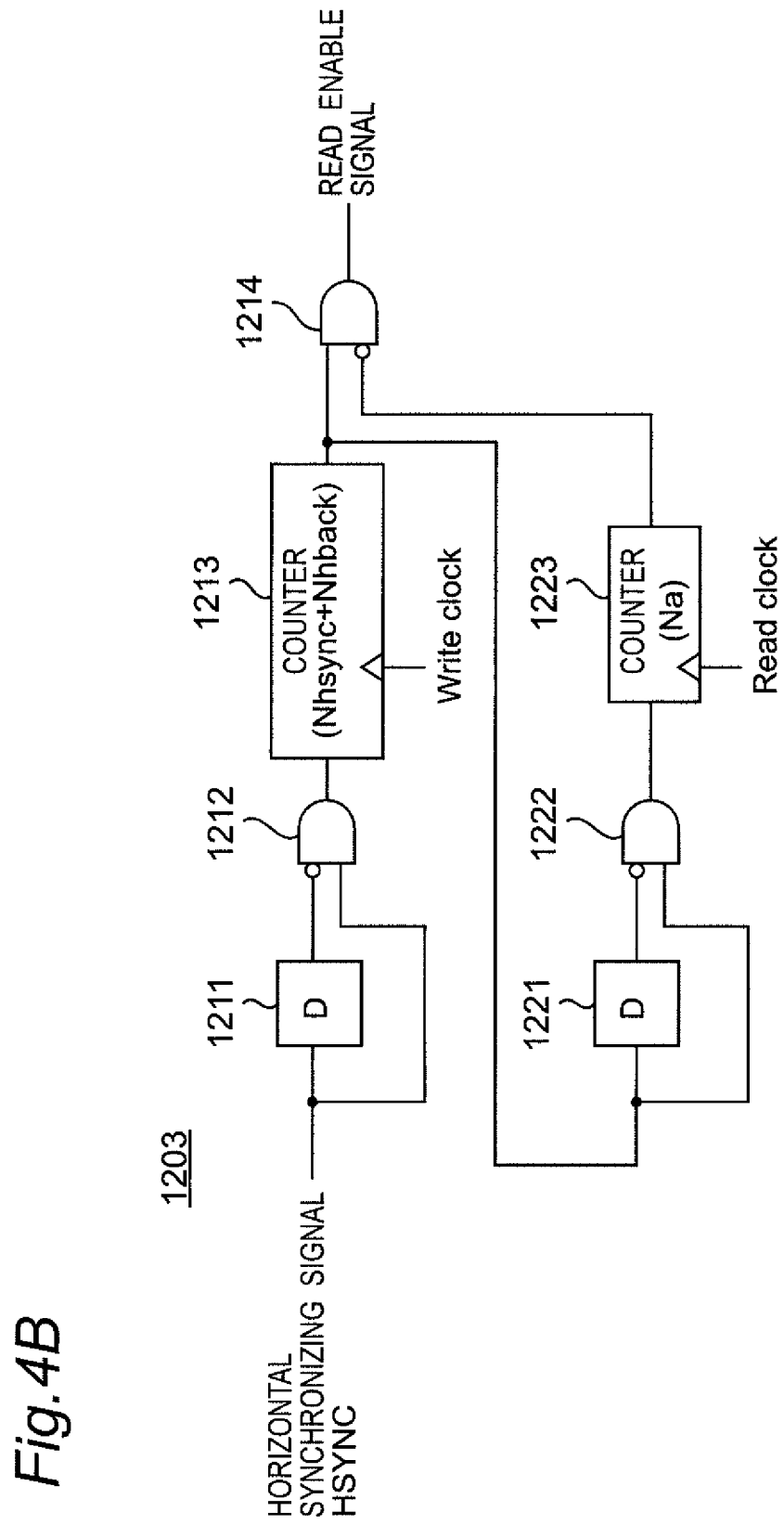
FIG. 4B is a circuit diagram showing a configuration of a memory control signal generator circuit 1203 of FIG. 4A.

FIG. 4B is a circuit diagram showing a configuration of a memory control signal generator circuit 1203 of FIG. 4A. Referring to FIG. 4B, the memory control signal generator circuit 1203 is configured to include delay type flip flops 1211 and 1221, AND gates 1212 and 1222, counters 1213 and 1223, and an AND gate 1214. In this case, the delay type flip flop 1211 and the AND gate 1212 extract a rising timing of the horizontal synchronizing signal HSYNC. In addition, the counter 1213 resets a count value into 0 when the high level signal is inputted thereto, and when the low level signal is inputted, then counts the Write clock of the pixel clock. If the counter 1213 counts (Nhsync+Nhback) bits which is described later, the counter 1213 makes the output signal be changed from the low level to the high level. Then, the delayed type flip flop 1221 and the AND gate 1222 extract a rising timing of the output signal of the counter 1213. In addition, the counter 1223 resets the count value to 0 when the high level signal is inputted, and when the low level signal is inputted, the counter 1223 counts the Read clock of the converted pixel clock. If the counter 1223 counts Na bits which is described later, the counter 1223 makes the output signal be changed from the low level to the high level. Then, based on the horizontal synchronizing signal HSYNC, the memory control signal generator circuit 1203 generates and outputs a read enable signal with the pixel clock and the converted pixel clock.

Since the format of the horizontal synchronizing signal inputted with the video signal is defined based on the number of horizontal pixels which is defined in advance, the horizontal synchronizing signal cannot be transmitted as it is if the horizontal blanking interval Hblank is removed. Therefore, based on the horizontal synchronizing signal HSYNC, the converted horizontal synchronizing signal generator circuit 1204 generates a converted horizontal synchronization signal HSYNC' which can be transmitted even when the horizontal blanking interval Hblank is removed. Then, the converted horizontal synchronizing signal HSYNC' is transmitted instead of the horizontal synchronizing signal HSYNC, and the receiver side restores the horizontal synchronizing signal HSYNC.

A data enable signal is inputted as the write enable signal to the buffer memory 1202 with the video signal, where the data enable signal is "1" for the horizontal active interval Hactive of the video signal, and is "0" for the horizontal blanking interval Hblank thereof.

Figure 5:
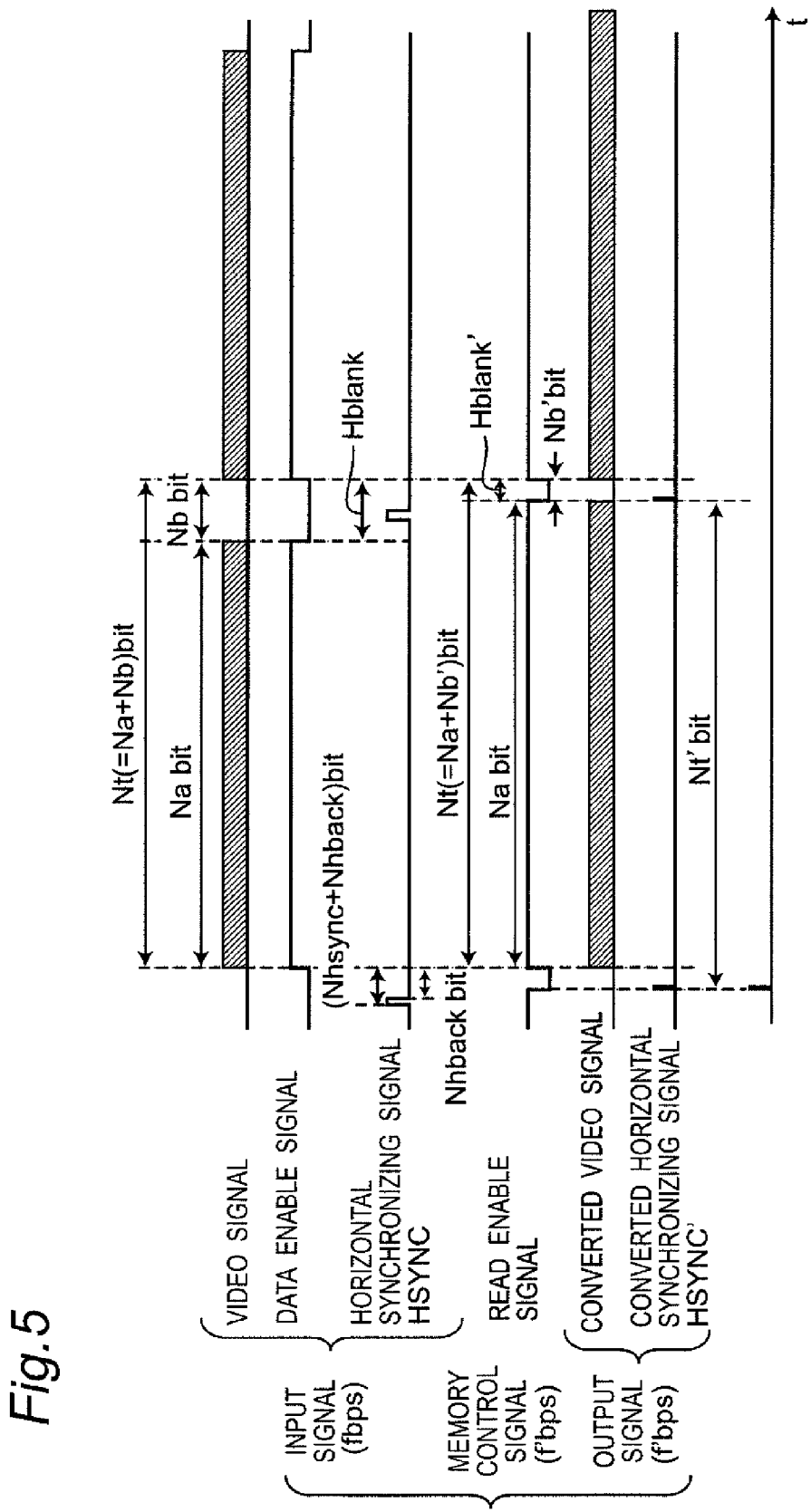
FIG. 5 is a timing chart of respective signals showing an operation of the video signal transmitter apparatus 1200 of FIG. 4A.

FIG. 5 is a timing chart of respective signals showing an operation of the video signal transmitter apparatus 1200 of FIG. 4A. Referring to FIG. 5, the relationship among timings of respective signals inputted to and outputted from the video signal transmitter apparatus 1200 will be described as an example in the case of 8-bit width of the video signal and the converted video signal. The number Nt of bits configuring one line of the video signal is the sum of the number Na of bits of the horizontal active interval Hactive and the number Nb of bits of the horizontal blanking interval Hblank. On the other hand, in the converted video signal, the number of bits of the horizontal active interval Hactive is Na which is the same as that of the video signal. If the number of bits of the horizontal blanking interval Hblank is Nb', the number Nt' of bits configuring one line is the sum (Na+Nb') of them.

In order to output the converted video signal as described above, the read enable signal is generated so as to be "1" only for an interval of Na bits at a transmission rate of f' bps, and thereafter to be "0" for an interval of Nb' bits. In order to minimize the required storage capacity of the buffer memory 1102, the rising of the read enable signal is matched with those of the video signal and the data enable signal. The rising timing of the read enable signal is detected directly from the data enable signal, or is detected with a reference to the rising of the horizontal synchronizing signal HSYNC by counting the pixel clock (Write clock) by the number of bits (Nhsync+Nhback) from the rising of the horizontal synchronizing signal HSYNC to the start timing of the horizontal active interval Hactive of the video signal by means of the counter 1213 of FIG. 4B. In addition, the falling timing of the read enable signal is detected by counting the converted pixel clock (Read clock) by the number of bits (Na) from the rising timing to the end timing of the active interval Hactive of the video signal by means of the counter 1223 of FIG. 4B. This allows the read enable signal to be generated.

Because in this case, when the horizontal active interval Hactive of the video signal is terminated, the converted video signal has been read out by Na×f'/f bits, the rest of the active interval Hactive of the converted video signal is Na×(1−f'/f) bits, which is the storage capacity of the buffer memory 1202 required at the minimum. It is noted that FIG. 5 shows an example of an ideal case without any delay in each block of FIG. 4A, and the timings are set in consideration of the delay time of each block in practice.

The converted horizontal synchronizing signal HSYNC' is generated so as to satisfy the following conditions, by the converted horizontal synchronizing signal generator circuit 1204:

(1) the converted horizontal synchronizing signal HSYNC' has the same period of cycle as the interval required for transmission of one horizontal line of the converted video signal; and (2) there is one pulse for one period of cycle; and (3) the interval of the pulse corresponds to one part or all (namely, at least one part) of the horizontal blanking interval Hblank of the converted video signal.

In the example of operation timing of respective signals of FIG. 5, the start of the horizontal blanking interval Hblank is matched with the rising of the pulse of the converted horizontal synchronizing signal HSYNC', however, the pulse of the converted horizontal synchronizing signal HSYNC' is not limited to this, and it is sufficient to provide the same pulse within the horizontal blanking interval Hblank.

By using the video signal transmitter apparatus according to the present embodiment, the control signals for the buffer memory can be easily generated by using the synchronizing signal (the horizontal synchronizing signal or the data enable signal) attached with the video signal. Further, even when the horizontal blanking interval Hblank is removed, it is possible to transmit the converted horizontal synchronizing signal HSYNC' representing the period of cycle of the horizontal line.

It is noted that in the video signal transmitter apparatus 1200 of FIG. 4A, the memory control signal generator circuit 1203 and the converted horizontal synchronizing signal generator circuit 1204 configure a control circuit for controlling the operation of the buffer memory 1202.

3-2. Video Signal Receiver Apparatus 2200

Figure 6A:
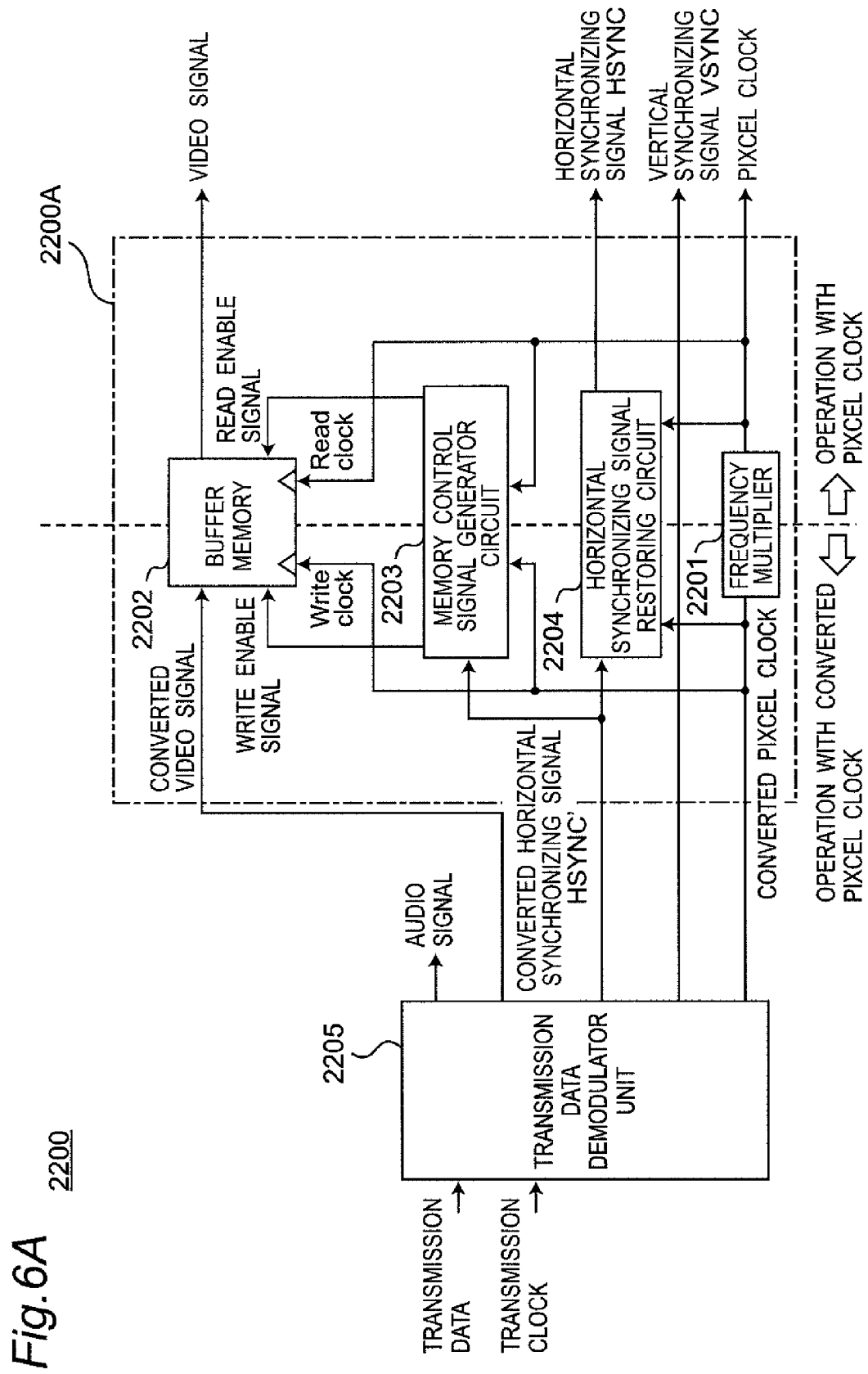
FIG. 6A is a block diagram showing a configuration of a video signal receiver apparatus 2200 according to the second embodiment of the present disclosure.

FIG. 6A is a block diagram showing a configuration of a video signal receiver apparatus 2200 according to the second embodiment of the present disclosure. Referring to FIG. 6A, the video signal receiver apparatus 2200 is configured to include a transmission data demodulator unit 2205, and a video signal receiver unit 2200A. The video signal receiver unit 2200A is configured to include a frequency multiplier 2201, a buffer memory 2202, a memory control signal generator circuit 2203, and a horizontal synchronizing signal restoring circuit 2204. In this case, the frequency multiplier 2201 and the buffer memory 2202 operate fundamentally in manners of those of the frequency multiplier 2101 and the buffer memory 1202 of FIG. 4, respectively. The configuration of the video signal receiver apparatus 2200 will be described on differences from the video signal receiver apparatus 2100 of FIG. 3.

Referring to FIG. 6A, when the transmission data transmitted from the video signal transmitter apparatus 1200 is demodulated by the transmission data demodulator unit 2205 in a manner similar to that of the prior art, the converted video signal is obtained instead of the video signal, the converted horizontal synchronizing signal is obtained instead of the horizontal synchronizing signal, and the converted pixel clock is obtained instead of the pixel clock. These obtained signals are inputted to the video signal receiver unit 2200A. It is noted that FIG. 6 shows that the transmission data demodulator unit 2205 also receives the transmission clock. However, the clock is regenerated without receiving the transmission clock, and the converted pixel clock may be obtained from the regenerated clock.

The converted horizontal synchronizing signal HSYNC', the converted pixel clock, and the pixel clock are inputted to the memory control signal generator circuit 2203. The memory control signal generator circuit 2203 generates such a write enable signal so as to be "1" for the horizontal active interval Hactive of the converted video signal, and to be "0" for the horizontal blanking interval Hblank thereof. The memory control signal generator circuit 2204 also generates such a read enable signal so as to be "1" for the horizontal active interval Hactive of the video signal, and to be "0" for the horizontal blanking interval Hblank thereof. The converted horizontal synchronizing signal HSYNC', the converted pixel clock, and the pixel clock are inputted to the horizontal synchronizing signal restoring circuit 2204, which restores the horizontal synchronizing signal HSYNC in a manner similar to that of the horizontal synchronizing signal restoring circuit 1204 of FIG. 4A.

Figure 6B:
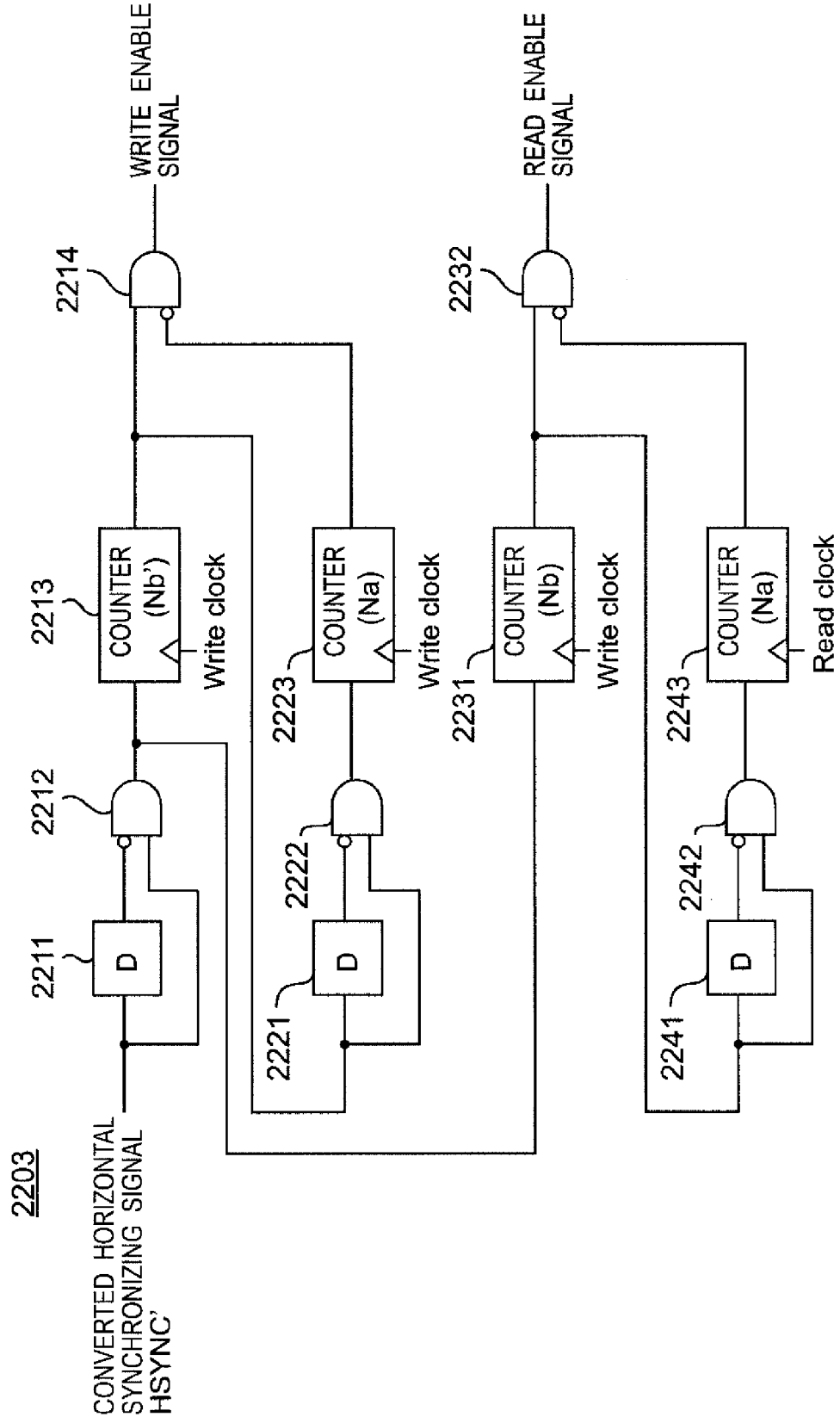
FIG. 6B is a circuit diagram showing a configuration of the memory control signal generator circuit 2203 of FIG. 6A.

FIG. 6B is a circuit diagram showing a configuration of the memory control signal generator circuit 2203 of FIG. 6A. Referring to FIG. 6B, the memory control signal generator circuit 2203 is configured to include delay type flip flops 2211, 2221 and 2241, AND gates 2212, 2214, 2222, 2232 and 2242, and counters 2213, 2223, 2231 and 2243. In this case, the delay type flip flop 2211 and the AND gate 2212 extract a rising timing of the converted horizontal synchronizing signal HSYNC. In addition, the counter 2213 resets a count value to 0 when the high level signal is inputted, and when the low level signal is inputted, the counter 2213 counts the Write clock of the converted pixel clock. When the counter 2213 counts Nb' bits which is described later, the counter 2213 makes the output signal be changed from the low level to the high level. Further, the delay-type flip flop 2221 and the AND gate 2222 extract a rising timing of the output signal of the counter 2213. In addition, the counter 2223 resets the count value to 0 when the high level is inputted, and when the low level signal is inputted, the counter 2223 counts the Write clock. When the counter 2223 counts Na bits which is described later, the counter 2223 makes the output signal be changed from the low level to the high level. On the other hand, counter 2231 resets the count value to 0 when the high level signal is inputted, and when the low level signal is inputted, the counter 2231 counts the Write clock. When the counter 2231 counts Nb bits which is described later, the counter 2231 makes the output signal be changed from the low level to the high level. Then the delay type flip flop 2241 and the AND gate 2242 extract a rising timing of the output signal of the counter 2231. In addition, the counter 2243 resets the count value to 0 when the high level signal is inputted, and when the low level signal is inputted, the counter 2243 counts the Read clock of the pixel clock. When the counter 2243 counts Na bits which is described later, the counter 2243 makes the output signal be changed from the low level to the high level. Then, based on the converted horizontal synchronizing signal HSYNC', the memory control signal generator circuit 2203 generates and outputs a write enable signal and a read enable signal using the converted pixel clock and the pixel clock.

Figure 7:
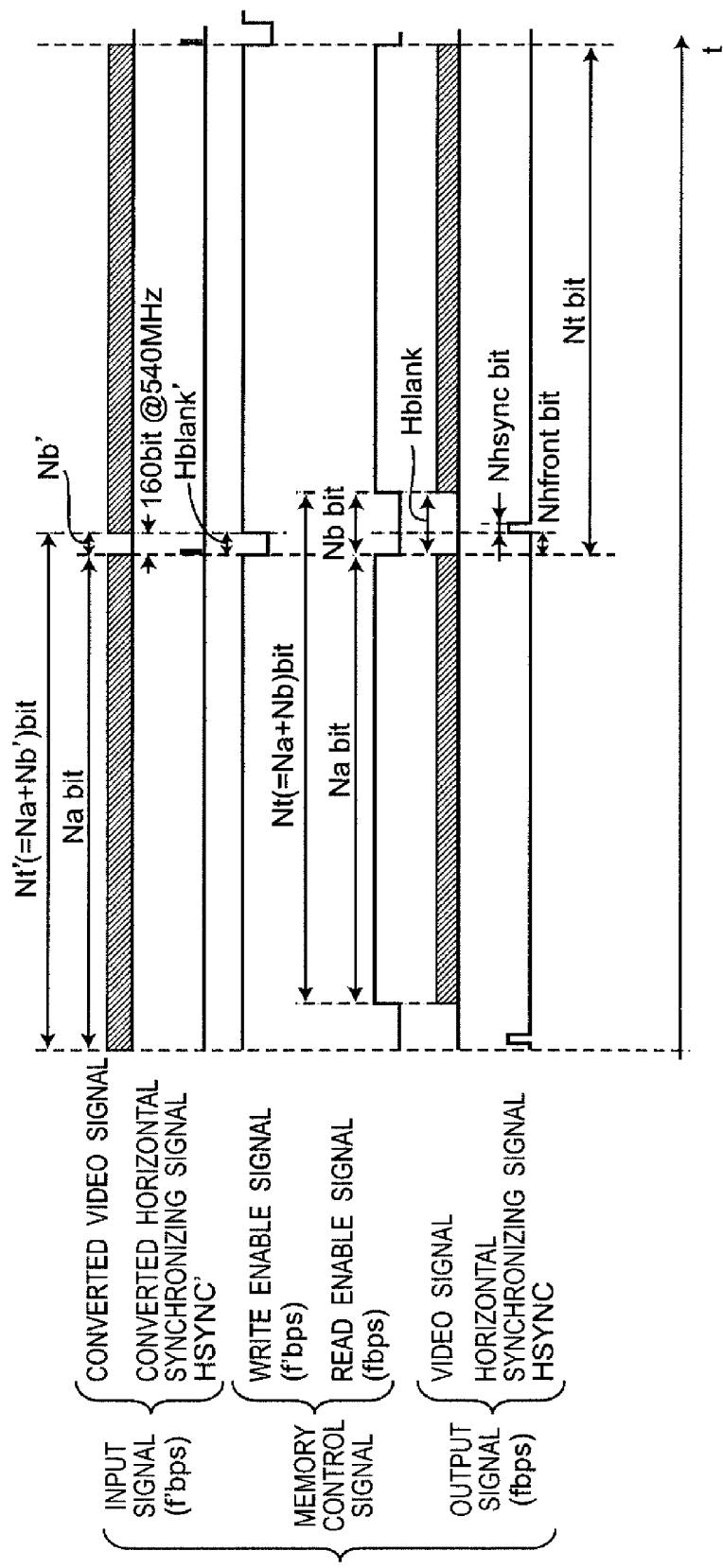
FIG. 7 is a timing chart of respective signals showing an operation of the video signal receiver apparatus 2200 of FIG. 6A.

FIG. 7 is a timing chart of respective signals showing an operation of the video signal receiver apparatus 2200 of FIG. 6A. Referring to FIG. 7, the relationship among timings of respective signals inputted to and outputted from the video signal receiver apparatus 2200.

The lengths of the horizontal blanking interval Hblank and the horizontal active interval Hactive of the converted video signal and the video signal, and the transmission rates thereof are the same as those of FIG. 5. The pulse width, the rising timing and the transmission rate of the converted horizontal synchronizing signal are the same as those of FIG. 5. In other words, the start timing of the horizontal blanking interval Hblank' of the converted video signal is matched with the rising timing of the pulse of the converted horizontal synchronizing signal HSYNC'. The generation of the write enable signal is performed by the following procedures.

(1) The start timing of the horizontal blanking interval Hblank' of the converted video signal is extracted from the converted horizontal synchronizing signal HSYNC'.

(2) With a reference to the start timing of the horizontal blanking interval Hblank' of the extracted converted video signal, the converted pixel clock (Write clock) is counted by the number of bits Nb' of the horizontal blanking interval Hblank' of the converted video signal by means of the counter 2213 of FIG. 6B. Thus, the end timing of the horizontal blanking interval Hblank' is detected. In addition, the converted pixel clock (Write clock) is counted by the number of bits Na of the converted video signal by means of the counter 2223 of FIG. 6B to determine the write enable signal. As a result, the write enable signal can be generated.

On the other hand, the generation of the read enable signal is performed by the following procedures.

(1) The start timing of the horizontal blanking interval Hblank of the video signal is determined. That is, in the example of FIG. 7, it is matched with the rising of the converted horizontal synchronizing signal HSYNC'. Then the start timing of the horizontal blanking interval Hblank' of the converted video signal is extracted from the converted horizontal synchronizing signal HSYNC', and the same timing as this is defined as the start timing of the horizontal blanking interval Hblank of the video signal.

(2) With a reference to the start timing of the horizontal blanking interval Hblank of the video signal, the pixel clock (Read clock) is counted by the number of bit Nb of the horizontal blanking interval Hblank by means of the counter 2231 of FIG. 6B, to detect the end timing of the horizontal blanking interval Hblank. In addition, the pixel clock (Read clock) is counted by the number of bits Na of the converted video signal by means of the counter 2243 of FIG. 6B, to determine the read enable signal. Thus, the read enable signal can be generated.

The restoration of the horizontal synchronizing signal is performed by the following procedures based on predetermined timings that are defined in the respective video formats of the video signals.

(1) With a reference to the start of the horizontal blanking interval Hblank, the pixel clock is counted by the number of bits Nhfront to the rising of the pulse of the horizontal synchronizing signal to determine the rising timing of the pulse.

(2) Further, the pixel clock is counted by the number of bits Nhsync of the pulse width to determine the falling timing of the pulse. Thus, the horizontal synchronizing signal HSYNC can be generated from the converted horizontal synchronizing signal HSYNC'.

It is noted that in the example of FIG. 7, the start of the horizontal blanking interval Hblank' of the converted video signal is matched with the rising of the pulse of the converted horizontal synchronizing signal HSYNC'. However, the pulse of the converted horizontal synchronizing signal HSYNC' is not limited to this timing, and it is sufficient to provide the pulse within the horizontal blanking interval Hblank. In this case, the converted pixel clock is counted by the number of bits Nhfront from the rising of the pulse of the converted horizontal synchronizing signal HSYNC' to the start of the horizontal blanking interval Hblank to extract the start timing of the horizontal blanking interval Hblank' of the converted video signal.

By using the video signal receiver apparatus 2200 according to the present embodiment configured as described above, using of the converted horizontal synchronizing signal HSYNC' transmitted from the video signal transmitter apparatus can easily perform generation of the control signals for the buffer memory and restoring of the horizontal synchronizing signal. Therefore, it is possible to receive the transmission data generated by using the video signal transmitter apparatus 1200, and to restore and output the video signal having the same signal format as that of the prior art.

It is noted that in the video signal receiver apparatus 2200 of FIG. 6A, the memory control signal generator circuit 2203 and the horizontal synchronizing signal restoring circuit 2204 configure a control circuit for controlling the operation of the buffer memory 2202.

4. Third Embodiment 4-1. Video Signal Transmitter Apparatus

Figure 8:
FIG. 8 is a table showing a method of setting a ratio of transmission frequency division of each of signal formats for transmission data according to the third embodiment of the present disclosure.

FIG. 8 is a table showing a method of setting a ratio of transmission frequency division of each of signal formats for transmission data according to the third embodiment of the present disclosure. The third embodiment will be described to deal with a plurality of signal formats for transmission data having resolutions different from each other by the same video signal transmitter apparatus and the same video signal receiver apparatus. The configuration of the video signal transmitter apparatus according to the present embodiment is the same as that of the second embodiment, and the third embodiment is characterized by a method of setting the number of horizontal pixels of the converted video signal and the ratio of transmission frequency division of the frequency divider 1201. With reference to the example of a table of FIG. 8, the method of setting the number of horizontal pixels and the ratio of transmission frequency division according to the present embodiment will be described.

FIG. 8 is an example of a case of transmitting data having three kinds of video formats including 720p, 1080p and 4K2K. In the present embodiment, by setting a common ratio of transmission frequency division for video formats different from each other, it is possible to commonly use the same configuration of the video signal transmitter apparatus. Due to this, the ratio of transmission frequency division is set according to the following procedures.

First of all, a common divisor (other than one and the number of horizontal pixels) of the horizontal pixels of the video signal before removal of the horizontal blanking interval Hblank in respective formats is obtained. In the example of FIG. 8, it is 1650 pixels in a video format system of 720p, it is 2200 pixels in a video format system of 1080p, and it is 4440 pixels in a video format system of 4K2K. Accordingly, the common divisors of these are 2, 5, 10, 11, 22, 25, 50, 55, 110, 275, and 550.

Next, a fraction having a denominator which is one of the obtained common divisors and a numerator which is a natural umber is set as the ratio of transmission frequency division. The ratio of transmission frequency division is the same as the ratio of the number of horizontal pixels of the converted video signal to the number of horizontal pixels of the video signal. Therefore, for all the video signal format systems for transmission, the values of the denominator and the numerator of the ratio of transmission frequency division are selected so that the number of horizontal pixels of the converted video signal is larger than the number of pixels for the active interval.

Further, when transmitting audio data, the ratio of transmission frequency division is set so as to secure the length of the horizontal blanking interval Hblank required for transmission of audio data. A common divisor of the number of horizontal pixels other than one and the number of horizontal pixels of the video signal is set as the denominator of the ratio of transmission frequency division, and then, for all the formats for transmission, the number of horizontal pixels of the converted video signal can be a natural number. Further, in addition to the above-mentioned conditions, when the denominator and the numerator are set to even numbers, respectively, the frequency divider 1201 can be easily configured. Furthermore, when the denominator is set to a small value as small as possible in the range of satisfying the above-mentioned conditions, it is possible to further simplify the structure of the frequency divider 1201. Further, when the numerator is set to a small value as small as possible, the ratio of removal of the horizontal blanking interval Hblank can be heightened.

By using the video signal transmitter apparatus according to the present embodiment, the horizontal blanking interval Hblank can be removed by the same method for a plurality of video formats having resolutions different from each other. Therefore, the configuration of the video signal transmitter apparatus can be commonly used.

4-2. Video Signal Receiver Apparatus

The configuration of the video signal receiver apparatus according to the third embodiment is the same as that of the second embodiment. In the video signal receiver apparatus, the reciprocal umber of the ratio of transmission frequency division of the video signal transmitter apparatus 1200 is set to the ratio of receiving frequency multiplication of the frequency multiplier 2201, namely, a common divisor of the number of horizontal pixels other than one and the number of horizontal pixels of respective formats is set to the numerator of the ratio of receiving frequency multiplication, and a natural number is set to the denominator thereof. It is noted that both of the denominator and the numerator of the ratio of receiving frequency multiplication are even numbers, respectively, and then, the frequency multiplier 2201 can be easily configured. Thus, for the video format systems having resolutions different from each other, it is possible to restore the horizontal blanking interval Hblank by the same method, and it is possible to commonly use the same configuration of the video signal receiver apparatus 2200.

5. Modified Embodiments

In the above embodiments, in the blanking interval of the video signal, the buffer memory 1102 may be controlled so as to remove a signal having the same length as that of a horizontal blanking interval to be removed every horizontal line for a vertical blanking interval existing periodically every frame.

In the above embodiments, "1" expressed as each signal being "1" may be a predetermined first value such as a high level, and "0" expressed as each signal being "0" may be a predetermined second value such as a low level. It is noted that the first and second values may be interchanged with each other.

Each of the buffer memories 1102, 1202, 2102 and 2202 in the above-mentioned embodiments may be storage means such as various kinds of memories.

6. Subject Matters of Present Disclosure

Examples of the disclosed techniques are as follows.

According to the first aspect of the present disclosure, there is provided a video signal transmitter apparatus that removes a part of a blanking interval of a video signal, generates and outputs a converted video signal, based on the video signal including an active interval including video data and the blanking interval excluding the video data. The video signal transmitter apparatus includes a frequency divider, a first storage unit, and a first controller. The frequency divider divides a frequency of a pixel clock in synchronization with the video signal by a predetermined ratio of transmission frequency division, generates and outputs a frequency-divided clock as a converted pixel clock. The first storage unit stores the video signal. The first controller controls the first storage unit to write the video signal for the active interval of the video signal, and read the video signal for the active interval of the converted video signal and output a read video signal as the converted video signal, and controls the first storage unit to remove a part of a signal included in a horizontal blanking interval existing periodically every horizontal line for the blanking interval of the video signal. The ratio of transmission frequency division is equal to a ratio of a number of horizontal pixels of the converted video signal to a number of horizontal pixels of the video signal.

In addition, according to the second aspect of the present disclosure, in the video signal transmitter of the first aspect, the first controller includes a first control signal generator, and a converted horizontal synchronizing signal generator. The first control signal generator generates a read enable signal having a predetermined value for an interval corresponding to a product of a number of pixels included in the active interval of the video signal and one clock interval of the converted pixel clock. The converted horizontal synchronizing signal generator generates and outputs a converted horizontal synchronizing signal having a period of cycle identical to an interval required for transmitting one horizontal line of the converted video signal, where the converted horizontal synchronizing signal has one pulse for one period of cycle, and an interval of the pulse corresponds to at least one part of the blanking interval of the converted video signal. The first controller controls the first storage unit to write the video signal for the active interval of the video signal, and read the video signal from the first storage unit for such an interval that a value of the read enable signal is a predetermined value and output a read video signal as the converted video signal.

Further, according to the third aspect of the present disclosure, in the video signal transmitter of the first or second aspect, the first controller controls the first storage unit to remove a signal having a length identical with that of a removed horizontal blanking interval every horizontal line for a vertical blanking interval existing periodically every frame in the blanking interval of the video signal.

Furthermore, according to the fourth aspect of the present disclosure, in the video signal transmitter of any one of the first to third aspects, the ratio of transmission frequency division is a number obtained by dividing a natural number by a divisor of a number of horizontal pixels other than one and the number of horizontal pixels of the video signal.

In addition, according to the fifth aspect of the present disclosure, in the video signal transmitter of any one of the first to four aspects, the video signal transmitter apparatus deals with a plurality of signal formats for transmission data having numbers of horizontal pixels different from each other. The ratio of transmission frequency division is a value obtained by dividing a natural number by a divisor of a number of horizontal pixels other than one and the number of horizontal pixels of the plurality of signal fox mats for transmission data.

Further, according to the sixth aspect of the present disclosure, in the video signal transmitter of any one of the first to fifth aspects, the ratio of transmission frequency division is a fraction having a denominator of an even number and a numerator of an even number.

Furthermore, according to the seventh aspect of the present disclosure, in the video signal transmitter of the sixth aspect, the ratio of transmission frequency division is 20/22.

According to the eighth aspect of the present disclosure, there is provided a video signal receiver apparatus that receives a converted video signal from the video signal transmitter apparatus of any one of the first to seventh aspects, and restores and outputs the video signal. The video signal receiver apparatus includes a frequency multiplier, a second storage unit, and a second controller. The video signal transmitter apparatus includes a frequency multiplier, a second storage unit, and a second controller. The frequency multiplier multiplies a frequency of the converted pixel clock by a predetermined ratio of receiving frequency multiplication, and output a frequency-multiplied converted pixel clock as a pixel clock. The second storage unit store the converted video signal. The second controller controls the second storage unit to write the converted video signal in the second storage unit for the active interval of the converted video signal, and to read the converted video signal from the second storage unit for the active interval of the video signal and output a read converted video signal as the video signal. The ratio of receiving frequency multiplication is a ratio of the number of horizontal pixels of the video signal to the number of horizontal pixels of the converted video signal.

In addition, according to the ninth aspect of the present invention, in the video signal receiver apparatus of the eighth aspect, the second controller includes a second control signal generator, and a horizontal synchronizing signal restoring unit. The second control signal generator generates a write enable signal for the active interval of the converted video signal, and generates a read enable signal for an interval corresponding to a product of a number of pixels included in the active interval of the video signal and one clock interval of the pixel clock. The horizontal synchronizing signal restoring unit generates a horizontal synchronizing signal for a predetermined interval within the blanking interval of the video signal, based on the converted horizontal synchronizing signal, where the horizontal synchronizing signal has a period of cycle identical with an interval of one line of the video signal. The second controller controls the second storage unit to write the converted video signal for an interval of the read enable signal, and read the converted video signal from the second storage unit for an interval of the read enable interval.

According to the tenth aspect of the present disclosure, there is provided a video signal transmitting method of removing a part of a blanking interval of a video signal, generates and outputs a converted video signal, based on the video signal including an active interval including video data and the blanking interval excluding the video data. The video signal transmitting method includes steps of:

dividing a frequency of a pixel clock in synchronization with the video signal by a predetermined ratio of transmission frequency division, generating and outputting a frequency-divided clock as a converted pixel clock;

controlling a first storage unit to write the video signal for the active interval of the video signal, and read the video signal from the first storage unit for the active interval of the converted video signal and output a read video signal as the converted video signal, and controlling the first storage unit to remove a part of a signal included in a horizontal blanking interval existing periodically every horizontal line for the blanking interval of the video signal.

The ratio of transmission frequency division is equal to a ratio of a number of horizontal pixels of the converted video signal to a number of horizontal pixels of the video signal.

In addition, according to the eleventh aspect of the present disclosure, there is provided a video signal receiving method of receiving a converted video signal generated by the video signal transmitting method of the tenth aspect, and restoring and outputting the video signal. The video signal receiving method includes steps:

multiplying a frequency of the converted pixel clock by a predetermined ratio of receiving frequency multiplication, and outputting a frequency-multiplied converted pixel clock as a pixel clock; and controlling the second storage unit to write the converted video signal in the second storage unit for the active interval of the converted video signal, and to read the converted video signal from the second storage unit for the active interval of the video signal and output a read converted video signal as the video signal.

The ratio of receiving frequency multiplication is a ratio of the number of horizontal pixels of the video signal to the number of horizontal pixels of the converted video signal.

As described above in detail, according to the video signal transmitter apparatus and the video signal transmitting method of the present disclosure, only the horizontal blanking interval can be removed without removing the vertical blanking interval, and therefore, required storage capacity of the buffer memory can be greatly reduced. In addition, sharing of the video signal transmitter apparatus without removing the blanking interval is also easy. Accordingly, it is possible to remove the blanking interval with minimizing the increase in the circuit scale, and this leads to decrease in the transmission rate. Further, according to the video signal receiver apparatus and the video signal receiving method of the present disclosure, a signal having a removed blanking interval is received, and it is possible to restore and output a signal having the same signal format for transmission data as that of the prior art.

Further, by using the synchronization signal inputted together with the video signal, it is possible to easily generate control signals for the buffer memory. In addition, it is possible to transmit the horizontal synchronizing signal even after removal of the blanking interval.

Furthermore, the ratio of transmission frequency division is set to a value obtained by dividing a natural number by a divisor of the number of horizontal pixels other than one and the number of horizontal pixels of the video signal, and this leads to that the number of horizontal pixels of a signal having a removed blanking interval is made to be a natural number without a special signal processing.

Furthermore, the ratio of transmission frequency division is set to a value obtained by dividing a natural number by a common divisor of the horizontal pixels other than one and the numbers of horizontal pixels of a plurality of signal formats for transmission data, and then, it is possible to remove the blanking interval for a plurality of video formats having resolutions different from each other, with the configuration of the common video signal transmitter apparatus.

Further, both of the numerator and the denominator of the transmission frequency division are set to even numbers, and then, it is possible to easily configure the divider for dividing the pixel clock.

The video signal transmitter apparatus and video signal transmitting method, and the video signal receiver apparatus and video signal receiving method are useful as transmission apparatuses or the like, which are used between apparatuses for handling video signals and are used within an apparatus for handling video signals.

Although the present invention has been fully described in connection with the embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A video signal transmitter apparatus that removes a part of a blanking interval of a video signal, and generates and outputs a converted video signal, based on the video signal including an active interval including video data and the blanking interval excluding the video data, the video signal transmitter apparatus comprising:

a frequency divider configured to divide a frequency of a pixel clock in synchronization with the video signal by a predetermined ratio of transmission frequency division, and generate and output a frequency-divided clock as a converted pixel clock;

a first storage unit configured to store the video signal; and a first controller that controls the first storage unit to write the video signal for the active interval of the video signal, and read the video signal for the active interval of the converted video signal and output a read video signal as the converted video signal, and that controls the first storage unit to remove a part of a signal included in a horizontal blanking interval existing periodically every horizontal line for the blanking interval of the video signal, wherein the ratio of transmission frequency division is equal to a ratio of a number of horizontal pixels of the converted video signal to a number of horizontal pixels of the video signal, wherein the first controller comprises:

a first control signal generator configured to generate a read enable signal having a predetermined value for an interval corresponding to a product of a number of pixels included in the active interval of the video signal and one clock interval of the converted pixel clock; and a converted horizontal synchronizing signal generator configured to generate and output a converted horizontal synchronizing signal having a period of cycle identical to an interval required for transmitting one horizontal line of the converted video signal, the converted horizontal synchronizing signal having one pulse for one period of cycle, an interval of the pulse corresponding to at least one part of the blanking interval of the converted video signal, and wherein the first controller controls the first storage unit to write the video signal for the active interval of the video signal, and read the video signal from the first storage unit for such an interval that a value of the read enable signal is a predetermined value and output the read video signal as the converted video signal.

2. The video signal transmitter apparatus as claimed in claim 1,
wherein the first controller controls the first storage unit to remove a signal having a length identical with that of a removed horizontal blanking interval every horizontal line for a vertical blanking interval existing periodically every frame in the blanking interval of the video signal.

3. The video signal transmitter apparatus as claimed in claim 1,
wherein the ratio of transmission frequency division is a number obtained by dividing a natural number by a divisor of a number of horizontal pixels other than one and the number of horizontal pixels of the video signal.

4. The video signal transmitter apparatus as claimed in claim 1,
wherein the video signal transmitter apparatus deals with a plurality of signal formats for transmission data having numbers of horizontal pixels different from each other, and
wherein the ratio of transmission frequency division is a value obtained by dividing a natural number by a divisor of a number of horizontal pixels other than one and the number of horizontal pixels of the plurality of signal formats for transmission data.

5. The video signal transmitter apparatus as claimed in claim 1,
wherein the ratio of transmission frequency division is a fraction having a denominator of an even number and a numerator of an even number.

6. The video signal transmitter apparatus as claimed in claim 1,
wherein the ratio of transmission frequency division is 20/22.

7. A video signal receiver apparatus that receives a converted video signal from a video signal transmitter apparatus and restores and outputs the video signal,
wherein the video signal transmitter apparatus removes a part of a blanking interval of a video signal, generates and outputs a converted video signal, based on the video signal including an active interval including video data and the blanking interval excluding the video data,
wherein the video signal transmitter apparatus comprises:
a frequency divider configured to divide a frequency of a pixel clock in synchronization with the video signal with a predetermined ratio of transmission frequency division, and generate and output a frequency-divided clock as a converted pixel clock;
a first storage unit configured to store the video signal; and
a first controller that controls the first storage unit to write the video signal for the active interval of the video signal, and read the video signal for the active interval of the converted video signal output a read video signal as the converted video signal, and that controls the first storage unit to remove a part of a signal included in a horizontal blanking interval existing periodically every horizontal line for the blanking interval of the video signal,
wherein the ratio of transmission frequency division is equal to a ratio of a number of horizontal pixels of the converted video signal to a number of horizontal pixels of the video signal,
wherein the video signal receiver apparatus comprises:
a frequency multiplier configured to multiply a frequency of the converted pixel clock by a predetermined ratio of receiving frequency multiplication, and output a frequency-multiplied converted pixel clock as a pixel clock;
a second storage unit configured to store the converted video signal; and
a second controller that controls the second storage unit to write the converted video signal in the second storage unit for the active interval of the converted video signal, and to read the converted video signal from the second storage unit for the active interval of the video signal and output a read converted video signal as the video signal,
wherein the ratio of receiving frequency multiplication is a ratio of the number of horizontal pixels of the video signal to the number of horizontal pixels of the converted video signal.

8. The video signal receiver apparatus as claimed in claim 7,
wherein the second controller comprises:
a second control signal generator configured to generate a write enable signal for the active interval of the converted video signal, and generate a read enable signal for an interval corresponding to a product of a number of pixels included in the active interval of the video signal and one clock interval of the pixel clock; and
a horizontal synchronizing signal restoring unit configured to generate a horizontal synchronizing signal for a predetermined interval within the blanking interval of the video signal, based on the converted horizontal synchronizing signal, the horizontal synchronizing signal having a period of cycle identical with an interval of one line of the video signal,
wherein the second controller controls the second storage unit to write the converted video signal for an interval of the write enable signal, and read the converted video signal from the second storage unit for an interval of the read enable interval.

9. A method of removing a part of a blanking interval of a video signal, and generating and outputting a converted video signal, based on the video signal including an active interval including video data and the blanking interval excluding the video data, the method comprising steps of:
dividing a frequency of a pixel clock in synchronization with the video signal by a predetermined ratio of transmission frequency division, and generating and outputting a frequency-divided clock as a converted pixel clock;
controlling a first storage unit to write the video signal for the active interval of the video signal, and read the video signal from the first storage unit for the active interval of the converted video signal and output a read video signal as the converted video signal, and controlling the first storage unit to remove a part of a signal included in a horizontal blanking interval existing periodically every horizontal line for the blanking interval of the video signal;
generating a read enable signal having a predetermined value for an interval corresponding to a product of a number of pixels included in the active interval of the video signal and one clock interval of the converted pixel clock; and
generating and outputting a converted horizontal synchronizing signal having a period of cycle identical to an interval required for transmitting one horizontal line of the converted video signal, the converted horizontal synchronizing signal having one pulse for one period of cycle, an interval of the pulse corresponding to at least one part of the blanking interval of the converted video signal, wherein the ratio of transmission frequency division is equal to a ratio of a number of horizontal pixels of the converted video signal to a number of horizontal pixels of the video signal, and wherein the controlling of the first storage unit to write comprises controlling the first storage unit to write the video signal for the active interval of the video signal, and read the video signal from the first storage unit for such an interval that a value of the read enable signal is a predetermined value and output the read video signal as the converted video signal.

10. A method of receiving a converted video signal generated by a video signal transmitting method and restoring and outputting the video signal, wherein the video signal transmitting method is provided for removing a part of a blanking interval of a video signal, and generating and outputting a converted video signal, based on the video signal including an active interval including video data and the blanking interval excluding the video data, wherein the video signal transmitting method comprises steps of:

dividing a frequency of a pixel clock in synchronization with the video signal by a predetermined ratio of transmission frequency division, and generating and outputting a frequency-divided clock as a converted pixel clock; and controlling a first storage unit to write the video signal for the active interval of the video signal, and read the video signal from the first storage unit for the active interval of the converted video signal and output a read video signal as the converted video signal, and controlling the first storage unit to remove a part of a signal included in a horizontal blanking interval existing periodically every horizontal line for the blanking interval of the video signal, wherein the ratio of transmission frequency division is equal to a ratio of a number of horizontal pixels of the converted video signal to a number of horizontal pixels of the video signal, wherein the method of receiving the converted video signal comprises:

multiplying a frequency of the converted pixel clock by a predetermined ratio of receiving frequency multiplication, and outputting a frequency-multiplied converted pixel clock as a pixel clock; and controlling a second storage unit to write the converted video signal in the second storage unit for the active interval of the converted video signal, and to read the converted video signal from the second storage unit for the active interval of the video signal and output a read converted video signal as the video signal, wherein the ratio of receiving frequency multiplication is a ratio of the number of horizontal pixels of the video signal to the number of horizontal pixels of the converted video signal.

* * * * *